United States Patent
Long et al.

(10) Patent No.: US 11,695,979 B2
(45) Date of Patent: Jul. 4, 2023

(54) METHOD AND DEVICE OF DISPLAYING MULTI-SCREEN INTERACTIVE

(71) Applicant: Shanghai Hode Information Technology Co., Ltd., Shanghai (CN)

(72) Inventors: Chunyu Long, Shanghai (CN); Hao Wang, Shanghai (CN); Yaoqi Zhang, Shanghai (CN); Zhihui Yang, Shanghai (CN); Menghui Wang, Shanghai (CN); Lei Huang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 233 days.

(21) Appl. No.: 17/308,649

(22) Filed: May 5, 2021

(65) Prior Publication Data
US 2021/0352351 A1 Nov. 11, 2021

(30) Foreign Application Priority Data
May 6, 2020 (CN) .......................... 202010371507.3

(51) Int. Cl.
*H04N 21/643* (2011.01)
*H04N 21/41* (2011.01)
*H04N 21/488* (2011.01)

(52) U.S. Cl.
CPC ..... *H04N 21/4126* (2013.01); *H04N 21/4882* (2013.01); *H04N 21/643* (2013.01); *H04N 21/4122* (2013.01)

(58) Field of Classification Search
None
See application file for complete search history.

(56) References Cited

U.S. PATENT DOCUMENTS

| | | | |
|---|---|---|---|
| 9,066,154 B2* | 6/2015 | Simpson | H04N 21/654 |
| 2003/0023981 A1* | 1/2003 | Lemmons | H04N 7/08 |
| | | | 725/135 |
| 2005/0276495 A1* | 12/2005 | Youm | H04N 21/233 |
| | | | 375/E7.006 |
| 2007/0199041 A1* | 8/2007 | Noll | H04N 21/8126 |
| | | | 348/E7.071 |

(Continued)

FOREIGN PATENT DOCUMENTS

| | | |
|---|---|---|
| CN | 102185884 A | 9/2011 |
| CN | 105872653 A * | 8/2016 |

(Continued)

*Primary Examiner* — William J Kim
(74) *Attorney, Agent, or Firm* — BakerHostetler

(57) ABSTRACT

The present application discloses techniques of implementing multi-screen display of interactive data. The techniques comprise receiving an interaction request from another computing device; establishing an interactive data connection channel with the other computing device according to the interaction request; receiving interactive data for the other computing device through the interactive data connection channel; determining a plurality of types of interactive data and corresponding interactive instructions included in the interactive data by analyzing field data in a data format of the interactive data based on a predetermined data format table; and performing display of the plurality of types of interactive data based on the corresponding interactive instructions.

20 Claims, 6 Drawing Sheets

Screen projection terminal 2

Computing device 1

(56) References Cited

U.S. PATENT DOCUMENTS

| | | | | |
|---|---|---|---|---|
| 2010/0263005 A1* | 10/2010 | White | ............... | H04L 67/02 |
| | | | | 709/206 |
| 2011/0247044 A1* | 10/2011 | Jacoby | ............... | H04N 21/4622 |
| | | | | 725/115 |
| 2011/0320627 A1* | 12/2011 | Landow | ............ | H04N 21/4348 |
| | | | | 709/231 |
| 2014/0013381 A1* | 1/2014 | Herigstad | ............ | H04N 21/858 |
| | | | | 725/141 |
| 2015/0289012 A1* | 10/2015 | Simpson | ............ | H04N 21/4622 |
| | | | | 725/18 |
| 2016/0227284 A1* | 8/2016 | Ordille | ............... | H04N 21/4788 |
| 2017/0026617 A1* | 1/2017 | Wang | ............... | H04N 7/147 |
| 2017/0272824 A1* | 9/2017 | Bunner | ............... | H04W 76/14 |
| 2019/0200054 A1* | 6/2019 | Dharmaji | ............ | H04N 21/4788 |

FOREIGN PATENT DOCUMENTS

| | | | | |
|---|---|---|---|---|
| CN | 106973309 A | | 7/2017 | |
| CN | 107517399 A | | 12/2017 | |
| CN | 109151536 A | | 1/2019 | |
| CN | 110519611 A | * | 11/2019 | ............ A63F 13/42 |
| CN | 110545457 A | | 12/2019 | |
| CN | 110913013 A | | 3/2020 | |
| CN | 111669438 A | * | 9/2020 | ......... H04L 12/1863 |
| WO | WO-2008080293 A1 | * | 7/2008 | ....... G06F 17/30203 |

* cited by examiner

METHOD AND DEVICE OF DISPLAYING MULTI-SCREEN INTERACTIVE

CROSS-REFERENCE TO RELATED APPLICATION

The present application claims priority of Chinese Patent Application No. 202010371507.3, filed on May 6, 2020, entitled "method and device of displaying multi-screen interactive". The entire content of the above-identified application is incorporated in the present application by reference.

BACKGROUND

With the development of computer technology, more and more kinds of electronic devices are developed and widely used. Various electronic devices generally have their own device characteristics. For example, mobile phone is more portable, TV screen displays better, and sound quality of a speaker is better. People continues to explore means to give full play to the device characteristics of different electronic devices.

SUMMARY

The present application provides a method and a device of displaying multi-screen interactive, a computing device and a computer-readable storage medium, which can solve the problems of single screen projection content and poor interactivity in the prior art.

A screen projection operation refers to the delivery of content from a computing device A to another computing device B, so that another computing device B may synchronously display the content as well. In one example, the establishing an interactive data connection channel with the screen projection terminal according to the interaction request, includes: obtaining the interactive data type included in the interaction request; querying interactive data connection channel types and establishment rules of the interactive data connection channel supporting all interactive data types from a preset interactive data connection channel information table, wherein the establishment rules include establishing a data communication link through a preset protocol; establishing the interactive data connection channel of the interactive data connection channel type according to the establishment rules.

In order to give full play to the device characteristics of different electronic devices, the electronic devices can switch and display the display content among a plurality of devices by means of projection, etc. However, the existing projection technology only supports the projection of audio and video, and other interactive data cannot be displayed. Therefore, the content of the projection is relatively simple and the interaction is not good. First, in order to achieve the above purpose, the present application provides a method of displaying multi-screen interactive, including:

receiving a request of displaying interactive data from another computing device; establishing an interactive data connection channel with the another computing device based on the request, wherein the interactive data connection channel is a second connection channel created based on another transmission protocol that is different from a transmission protocol used to create an audio and video data connection channel, wherein the audio and video data connection channel is created based on a Transmission Control Protocol (TCP), and wherein the interactive data connection channel is created based on a User Datagram Protocol (UDP); receiving the interactive data from the another computing device through the established interactive data connection channel; determining a plurality of types of interactive data and corresponding interactive instructions included in the interactive data by analyzing field data in a data format of the interactive data based on a predetermined data format table; and performing display of the plurality of types of interactive data based on the corresponding interactive instructions.

Compared with the existing technology, the method and device of displaying multi-screen interactive, computing device and computer-readable storage medium provided by the present application can establish an interactive data connection channel with the screen projection terminal according to an interaction request after receive the interaction request from the screen projection terminal; then receive interactive data of the screen projection terminal through the interactive data connection channel; and analyze field data of the interactive data according to an interactive data format table to obtain each interactive data type and corresponding interactive instruction in the interactive data; finally, interactive display on the interactive data of the corresponding interactive data type according to the interactive instruction of each interactive data type. By establishing the interactive data connection channel to transmit interactive data, and by setting the interactive data types and corresponding interactive instructions to the field data in the data format of the interactive data, the screen projection terminal can quickly and accurately extract the interactive instructions and execute the display of the interactive data after receiving the interactive data; moreover, it can support more types of projected contents.

DETAILED DESCRIPTION OF ILLUSTRATIVE EMBODIMENTS

To make the purposes, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly, in addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Figure 1:
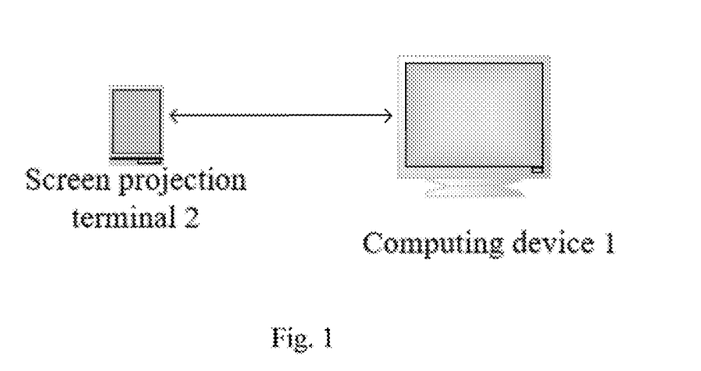
FIG. 1 is a schematic diagram of an application environment of an embodiment of the present application.

FIG. 1 is a schematic diagram of an application environment of an embodiment of the present application. Referring to FIG. 1, a computing device 1 is connected to a screen projection terminal 2, and can receive an interaction request from the screen projection terminal 2, and establish an interactive data connection channel with the screen projection terminal according to the interaction request, and receive the interactive data of the screen projection terminal 2 through the interactive data connection channel. Then, each interactive data type and corresponding interactive instruction in the interactive data is parsed out according to an interactive data format table, and interactive display is performed on the interactive data of the corresponding interactive data type according to the interactive instruction of each interactive data type. In the embodiment, the screen projection terminal 2 can be a mobile phone, a tablet, a portable device or a PC, etc.; the computing device 1 can be a mobile phone, a tablet, a portable device, a PC, or an electronic device with a display function, etc.

Embodiment 1

Figure 2:
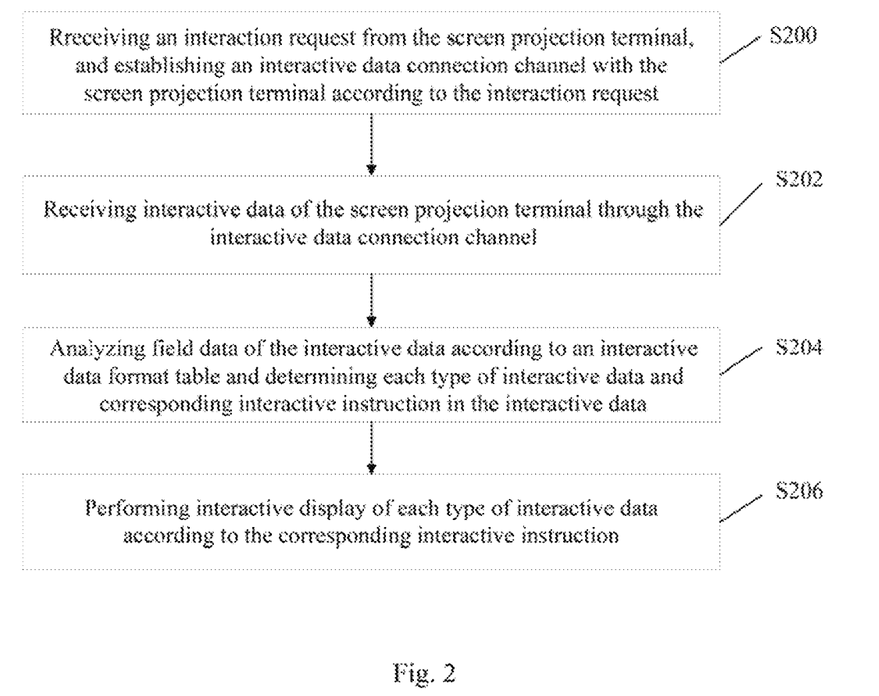
FIG. 2 is a schematic flowchart of a specific embodiment of the method of displaying multi-screen interactive of the present application.

FIG. 2 is a schematic flowchart of an embodiment of a method of displaying multi-screen interactive of the present application. It can be understood that the flowchart in the method embodiment is not used to limit the order of execution of the steps. The following exemplarily describes the computing device 1 as an execution subject.

As shown in FIG. 2, the method of displaying multi-screen interactive may include steps S200 to S206, wherein:

Step S200, receiving an interaction request from the screen projection terminal, and establishing an interactive data connection channel with the screen projection terminal according to the interaction request.

Step S202, receiving interactive data of the screen projection terminal through the interactive data connection channel.

Specifically, when a user wants to project audio and video data on the screen projection terminal onto the computing device 1, the screen projection terminal needs to connect to the computing device 1 first, and then the user sends a screen projection request to the computing device 1 through the screen projection terminal. The computing device 1 receives the screen projection request, and then establishes the audio and video data connection channel according to the screen projection request. In the embodiment, the projection terminal needs to project the video data of on demand, live broadcast or real-time playback to the computing device 1. Therefore, the screen projection terminal needs to encapsulate the format and resource path or address of the audio and video data to be screened into the screen projection request and send it to the computing device 1. Since the audio and video data connection channels generally support most of audio and video formats, the computing device 1 can directly establish the audio and video data connection channel after receiving the screen projection request to transmit the audio and video data in the screen projection contents. Then the computing device 1 is connected to the resource address or path through the audio and video data connection channel, and accesses the audio and video data, so the audio and video data can be called and displayed on a target display window.

For example, a projection terminal orders a video a from a resource address A, and when the projection terminal needs to project the on-demand video a to the computing device 1, the projection terminal sends a screen projection request to the computing device 1, then the computing device 1 establishes an audio and video data connection channel according to the screen projection request, and then obtains the resource address A from the screen projection request, and finally connects to the resource address A connected to the screen projection terminal through the audio and video data connection channel, and then access and play the video a. For another example, when the projection terminal directly projects captured audio and video data, the computing device 1 can directly connect to a shooting unit of the projection terminal through the audio and video data connection channel, and obtain can obtain the audio and video data shot by the shooting unit of the projection terminal in real time for playback.

Of course, in the process of screen projection, the user can also trigger an interactive message through the screen projection terminal. When the user triggers the interactive message through the screen projection terminal, for example, the user makes a bullet screen or a reward through the screen projection terminal, then the screen projection terminal sends an interaction request to the computing device 1. After receiving the interaction request, the computing device 1 obtains the interactive data type in the interaction request. In the embodiment, the interactive data type includes at least one of text, picture, bullet screen (animated comments, e.g., comments scrolling across video frames), reward, gift, and special effect package. Then, the computing device 1 further establishes an interactive data connection channel with the projection terminal according to the interactive data type, and the interactive data connection channel is used to transmit the above interactive data. That is, the interactive data connection channel is a second connection channel different from the audio and video data connection channel.

Figure 3:
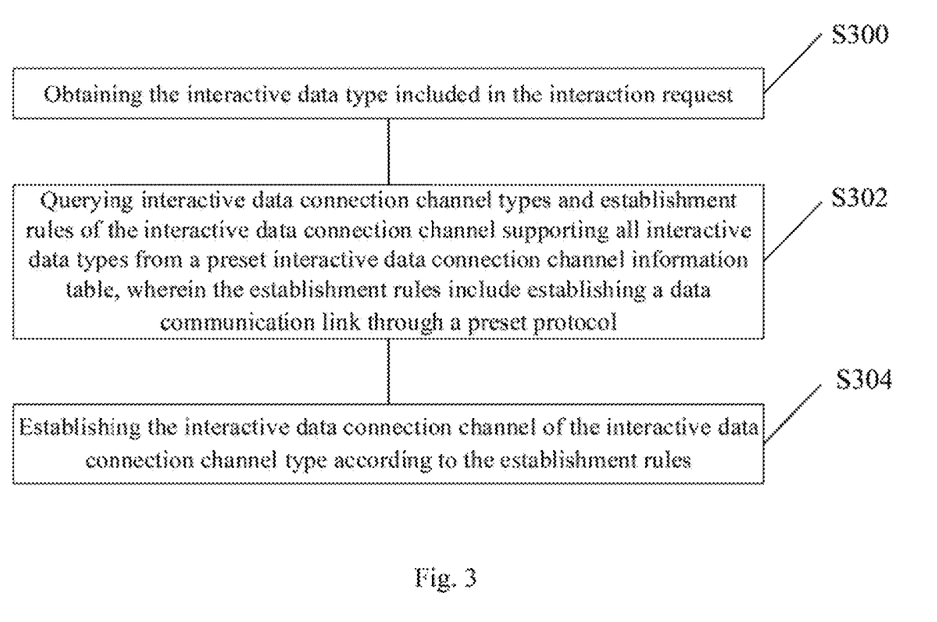
FIG. 3 is a schematic flowchart of a specific embodiment of establishing an interactive data connection channel with the screen projection terminal according to the interaction request in step S200.

As shown in FIG. 3, in an exemplary embodiment, the establishing an interactive data connection channel with the projection terminal according to the interaction request in step S200 includes steps S300 to S304.

Step S300, obtaining the interactive data type included in the interaction request.

Step S302, querying interactive data connection channel types and establishment rules of the interactive data connection channel supporting all interactive data types from a preset interactive data connection channel information table, wherein the establishment rules include establishing a data communication link through a preset protocol.

Step S304, establishing the interactive data connection channel of the interactive data connection channel type according to the establishment rules.

In the embodiment, the computing device 1 and the screen projection terminal are pre-configured with an interactive data connection channel information table including establishment rules for interactive data connection channels for different interactive data. Therefore, when the computing device 1 queries the interactive data connection channel type and establishment rules of the interactive data connection channel supporting all interactive data types from the preset interactive data connection channel information table according to the interactive data type after obtaining the interactive data type, and then establishes the interactive data connection channel of the interactive data connection channel type according to the establishment rules. In the embodiment, the establishment rules include establishing a data communication link through a preset protocol; the interactive data connection channel includes a communication link that supports the transmission of interactive data of at least one interactive data type. For example, the general audio and video data channel is based on the UDP protocol (User Datagram Protocol), which only supports the data link for audio and video data transmission. Therefore, the computing device 1 can establish a data link of the interactive data type, that is, the interactive data connection channel, such as the interactive data type can be the supporting bullet screen of TCP protocol (Transmission Control Protocol) or the reward. Of course, the data format that supports transmission included in the establishment rule of the interactive data connection channel corresponds to the format of the interactive data type. After the computing device 1 establishes an interactive data connection channel with the screen projection terminal, the interactive data of the screen projection terminal can be received through the interactive data connection channel.

In another specific embodiment, when none of the interactive data connection channel in the interactive data connection channel information table supports all interactive data types, the interactive data connection channel types and the establishment rules of a plurality of interactive data connection channels supporting all interactive data types are queried, and the plurality of the interactive data connection channels are established sequentially. Then, the computing device 1 receives the interactive data transmitted by the projection terminal through the plurality of the interactive data connection channels.

Step S204, analyzing field data of the interactive data according to an interactive data format table to obtain each interactive data type and corresponding interactive instruction in the interactive data.

Step S206, performing interactive display on the interactive data of the corresponding interactive data type according to the interactive instruction of each interactive data type.

Figure 4:
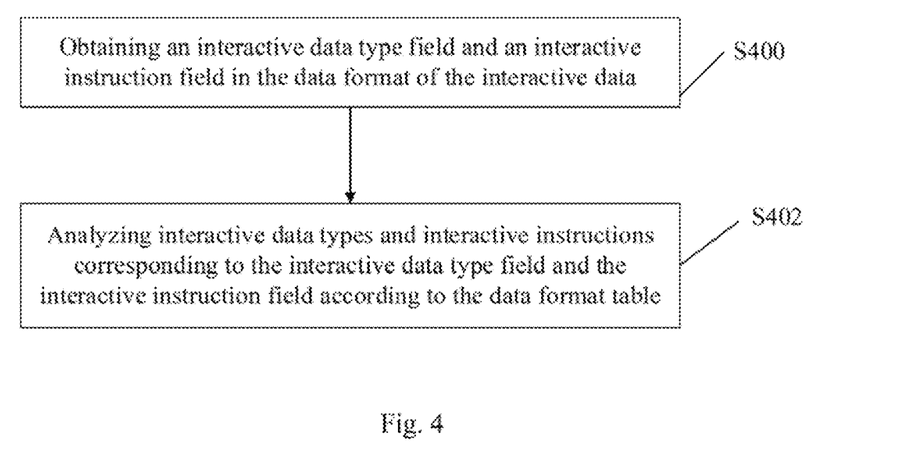
FIG. 4 is a schematic flowchart of a specific embodiment of step S204.

As shown in FIG. 4, in an exemplary embodiment, the step S204 specifically includes steps S400 to S402.

Step S400, obtaining an interactive data type field and an interactive instruction field in the data format of the interactive data.

Step S402, analyzing interactive data types and interactive instructions corresponding to the interactive data type field and the interactive instruction field according to the data format table.

Specifically, the computing device 1 and the screen projection terminal (i.e., another computing device) pre-set the data format of the interactive data. In the embodiment, the data format includes a variety of field data, such as: a header field, an interactive data type field, an effective data field, a serial number field, a version number field, a time stamp field and an interactive instruction field. Wherein, the header field identifies the data segment as interactive data; the interactive data type field identifies the interactive data type; the effective data field stores the interactive data; the serial number field and the version number field identify the generation serial number and version number of the interactive data respectively; the timestamp field identifies sending time of the interactive data; the interactive instruction field stores what interactive operation should be performed for the interactive data; the timestamp field identifies the time the interactive data is sent; and the interactive instruction field stores what interactive operation should be performed for the interactive data. Correspondingly, the screen projection terminal and the computing device 1 store a data format table describing the field format of interactive data respectively.

Therefore, after the computing device 1 obtains the interactive data, the interactive data type and interactive instruction corresponding to the interactive data type field and the interactive instruction field can be analyzed according to the data format table. Then, according to the interactive instruction of each interactive data type, interactive display is performed on the interactive data of the corresponding interactive data type. For example, the interactive data analyzed by the computing device 1 according to the data format table includes special effect package data types and corresponding interactive instructions, that is, a display mode of the special effect package interactive data. Then, the computing device 1 displays the interactive data according to the display mode of the special effect package interactive data.

Of course, in a specific embodiment, when the screen projection terminal and the computing device 1 have preset an encryption and decryption method for the interactive data, the computing device 1 performs decryption on the interactive data according to the preset decryption method after receiving the interactive data.

In addition, in an exemplary embodiment, when the screen projection terminal sends more interactive data at a time, the computing device 1 further obtains an execution priority of each interactive data type of the interactive data; and perform interaction on the interactive data of different interactive data types sequentially according to the execution priority. In the embodiment, a priority field needs to be set in the data format of the interactive data, and then the computing device 1 obtains the priority of each interactive data type, and sequentially executes the interactive instructions corresponding to the interactive data type according to the priority. The method can be executed methodically when dealing with large amounts of interactive data.

In summary, the method of displaying multi-screen interactive provided in the embodiment can establish an interactive data connection channel with the screen projection terminal according to an interaction request after receiving the interaction request from the screen projection terminal; then receive interactive data of the screen projection terminal through the interactive data connection channel; and analyze field data of the interactive data according to an interactive data format table to obtain each interactive data type and corresponding interactive instruction in the interactive data; finally, interactive display on the interactive data of the corresponding interactive data type according to the interactive instruction of each interactive data type. The present application transmits interactive data by establishing an interactive data connection channel, and performs corresponding interactive display according to different interactive data types. Compared with the current small-screen device casting to a large-screen device, it is generally mirrored or the small-screen device directly sends audio and video data to the large-screen device for playback, the present application can support more types of screen projection contents and realize the interactive nature of the screen projection.

Embodiment 2

Figure 5:
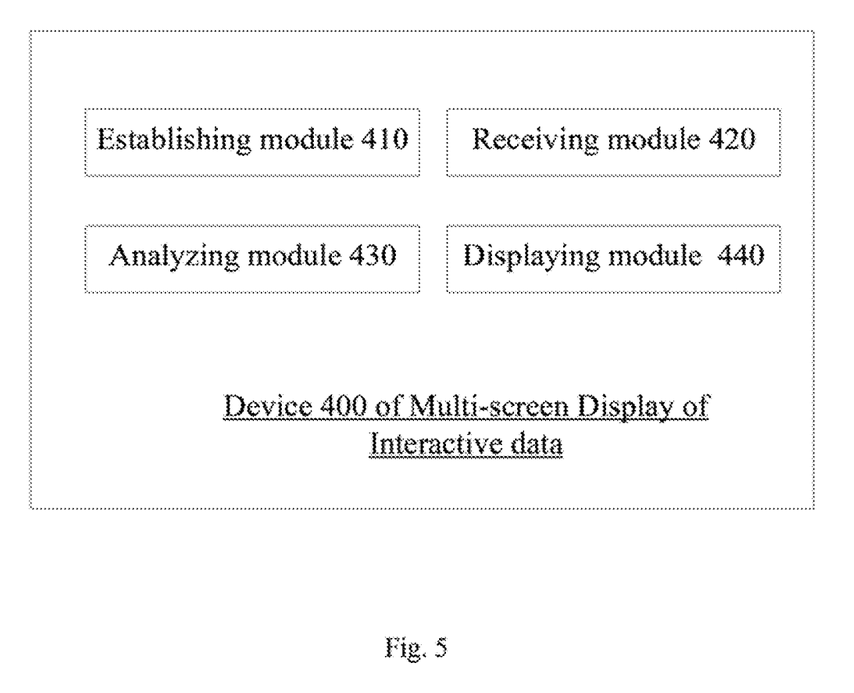
FIG. 5 is a schematic diagram of program modules of an embodiment of a device of displaying multi-screen interactive according to the present application.

FIG. 5 schematically shows a block diagram of a device of displaying multi-screen interactive according to a second embodiment of the present application. The device of displaying multi-screen interactive may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 5, the device of displaying multi-screen interactive 400 can include an establishing module 410, a receiving module 420, an analyzing module 430 and a displaying module 440, wherein:

The establishing module 410, receiving an interaction request from the screen projection terminal, and establishing an interactive data connection channel with the screen projection terminal according to the interaction request;

The receiving module 420, receiving interactive data of the screen projection terminal through the interactive data connection channel;

The analyzing module 430, analyzing field data of the interactive data according to an interactive data format table to obtain each interactive data type and corresponding interactive instruction in the interactive data;

The displaying module 440, performing interactive display on the interactive data of the corresponding interactive data type according to the interactive instruction of each interactive data type.

In an exemplary embodiment, the establishing module 410, further obtaining the interactive data type included in the interaction request; querying interactive data connection channel types and establishment rules of the interactive data connection channel supporting all interactive data types from a preset interactive data connection channel information table, wherein the establishment rules include establishing a data communication link through a preset protocol; establishing the interactive data connection channel of the interactive data connection channel type according to the establishment rules. Querying the interactive data connection channel types and the establishment rules of a plurality of interactive data connection channels supporting all interactive data types, and establishing the plurality of the interactive data connection channels sequentially when none of the interactive data connection channel in the interactive data connection channel information table supports all interactive data types. Wherein, the interactive data connection channel is a second connection channel different from an audio and video data connection channel.

In an exemplary embodiment, the analyzing module 430, further performing decryption on the interactive data according to a preset decryption method; obtaining an interactive data type field and an interactive instruction field in the data format of the interactive data; analyzing interactive data types and interactive instructions corresponding to the interactive data type field and the interactive instruction field according to the data format table.

In an exemplary embodiment, the displaying module 440, further obtaining an execution priority of each interactive data type of the interactive data; performing interaction on the interactive data of different interactive data types sequentially according to the execution priority.

Embodiment 3

Figure 6:
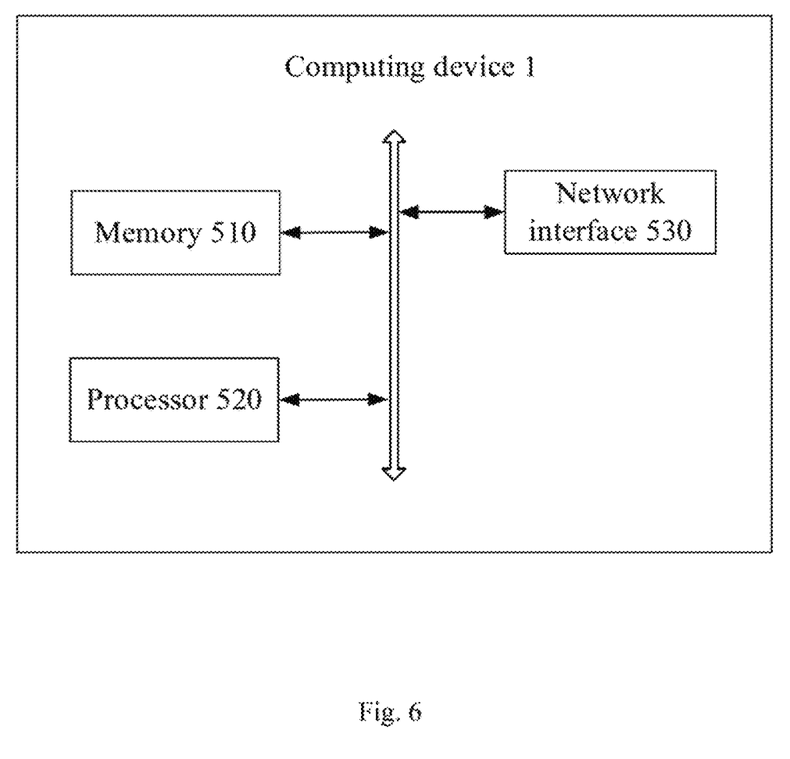
FIG. 6 is a schematic diagram of an optional hardware architecture of a computing device of the present application.

FIG. 6 schematically shows a schematic diagram of the hardware architecture of the computing device 1 suitable for implementing the method of displaying multi-screen interactive according to a third embodiment of the present application. In the embodiment, the computing to device 1 is a device capable of automatically performing numerical calculations and/or information processing according to predefined or stored instructions. For example, can be a Smartphone, a tablet, a laptop, a desktop computer, a rack server, a blade server, a tower server, or a cabinet server (including stand-alone servers, or a cluster of a plurality of servers), and so on. As shown in FIG. 6, the computing device 1 includes at least, but is not limited to, a memory 510, a processor 520, and a network interface 530 that can be communicated with each other through a system bus. Wherein:

The memory 510 includes at least one type of computer-readable storage medium. The readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 510 may be an internal storage module of the computing device 500 such as a hard disk or a memory of the computing device 1. In other embodiments, the memory 510 may also be an external storage device of the computing device 1, such as a plugged hard disk provided on the computing device 1, a Smart Media Card (SMC), a Secure Digital (SD) card, a flash memory card, and the like. Of course, the memory 510 may also include both the internal storage module and the external storage device of the computing device 1. In the embodiment, the memory 510 is generally used to store an operating system and various types of application software installed in the computing device 1 such as program codes of method of displaying multi-screen interactive and the like. In addition, the memory 510 may also be used to temporarily store various types of data that have been or will be outputted.

The processor 520, in some embodiments, may be a Central Processing Unit (CPU), a controller, a microprocessor, or other data processing chip. The processor 520 is generally used to control the overall operation of the computing device 1 such as performing control and processing related to data interaction or communication with the computing device 1. In the embodiment, the processor 520 is used to run program codes or process data stored in the memory 510.

The network interface 530 may include a wireless network interface or a wired network interface which is generally used to establish a communication connection between the computing device 1 and other computing devices. For example, the network interface 530 is used for connecting the computing device 1 to an external terminal via a network and establishing a data transmission channel and a communication connection between the computing device 1 and the external terminal. The network can be a wireless or wired network such as an enterprise Intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 6 shows only a computing device 1 having components 510-530, but it should be understood that it is not required to implement all of the shown components and that more or fewer parts can be implemented in lieu thereof.

In the embodiment, the program codes of the method of displaying multi-screen interactive stored in the memory 510 also may be divided into one or more program modules and executed by one or more processors (the processor 510 in the embodiment) to complete the present application.

Embodiment 4

The embodiment also provides a computer-readable storage medium, which stores computer programs, and when the computer programs are executed by a processor, the following steps are implemented:

receiving an interaction request from another computing device; establishing an interactive data connection channel with the other computing device according to the interaction request; receiving interactive data from the other computing device through the interactive data connection channel; analyzing field data of the interactive data according to a data format table and determine each type of interactive data and corresponding interactive instruction in the interactive data; performing interactive display on the interactive data of the corresponding interactive data type according to the interactive instruction of each interactive data type.

In the embodiment, the computer-readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EE-PROM), a Programmable Read-Only Memory (PROM), a magnetic memory, a magnetic disk, an optical disk, etc. In some embodiments, the computer-readable storage medium may be an internal storage module of the computing device 500 such as a hard disk or memory of the computing device. In other embodiments, the memory may also be an external storage device of the computing device, such as a plugged hard disk provided on the computing device, a Smart Media Card (SMC), a Secure Digital (SD) card, a flash memory card, and the like. Of course, the computer-readable storage medium may also include both the internal storage module and the external storage device of the computing device. In the embodiment, the computer-readable storage medium is generally used to store an operating system and various types of application software installed in the computing device such as program codes of the method of implementing multi-screen display of interactive data and the like. In addition, the computer-readable storage medium may also be used to temporarily store various types of data that have been or will be outputted.

Apparently, it should be appreciated by those skilled in the art that each module or step described in the embodiment of the present application can be realized by a general-purpose and the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described to herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of implementing multi-screen display of interactive data, comprising:

receiving a request of displaying interactive data from another computing device;

establishing an interactive data connection channel with the another computing device based on the request, wherein the interactive data connection channel is a second connection channel created based on another transmission protocol that is different from a transmission protocol used to create an audio and video data connection channel, wherein the audio and video data connection channel is created based on a Transmission Control Protocol (TCP), and wherein the interactive data connection channel is created based on a User Datagram Protocol (UDP);

receiving the interactive data from the another computing device through the established interactive data connection channel;

determining a plurality of types of interactive data and corresponding interactive instructions included in the interactive data by analyzing field data in a data format of the interactive data based on a predetermined data format table; and performing display of the plurality of types of interactive data based on the corresponding interactive instructions.

2. The method of claim 1, wherein the establishing an interactive data connection channel with the other computing device based on the request further comprises:

determining types of the interactive data included in the request;

determining a type of interactive data connection channel and establishment rules corresponding to the type of interactive data connection channel based at least in part on a predetermined information table of interactive data connection channels, wherein the type of interactive data connection channel supports all of the types of the interactive data, and wherein the establishment rules comprise establishing a data communication link based on a predetermined protocol; and establishing the type of interactive data connection channel based on the corresponding establishment rules.

3. The method of claim 2, further comprising:

in response to determining that none of a single interactive data connection channel supports all of the types of the interactive data, determining a plurality of types of interactive data connection channels and a plurality of sets of establishment rules corresponding to the plurality of types of interactive data connection channels, and establishing the plurality of types of interactive data connection channels sequentially based on the corresponding plurality of sets of establishment rules, wherein the plurality of types of interactive data connection channels support all of the types of the interactive data.

4. The method of claim 1, wherein the determining a plurality of types of interactive data and corresponding interactive instructions included in the interactive data by analyzing field data in a data format of the interactive data based on a predetermined data format table further comprises:
obtaining type field data and interactive instruction field data from the data format of the interactive data; and
determining the plurality of types of interactive data and the corresponding interactive instructions based at least in part on the type field data and the interactive instruction field data.

5. The method of claim 1, further comprising:
performing decryption on the interactive data before analyzing the field data of the interactive data.

6. The method of claim 1, further comprising:
obtaining an execution priority corresponding to each type of interactive data among the plurality of types of interactive data; and
performing interaction operation on each type of interactive data sequentially based on the corresponding execution priority.

7. The method of claim 1, wherein the plurality of types of interactive data comprise a bullet screen, a reward, a gift and a special effect package.

8. A computing device, comprising:
at least one processor; and
at least one memory communicatively coupled to the at least one processor and storing instructions that upon execution by the at least one processor cause the computing device to perform operations comprising:
receiving a request of displaying interactive data from a second computing device;
establishing an interactive data connection channel with the second computing device based on the request, wherein the interactive data connection channel is a second connection channel created based on another transmission protocol that is different from a transmission protocol used to create an audio and video data connection channel, wherein the audio and video data connection channel is created based on a Transmission Control Protocol (TCP), and wherein the interactive data connection channel is created based on a User Datagram Protocol (UDP);
is receiving the interactive data from the second computing device through the established interactive data connection channel;
determining a plurality of types of interactive data and corresponding interactive instructions included in the interactive data by analyzing field data in a data format of the interactive data based on a predetermined data format table; and
performing display of the plurality of types of interactive data based on the corresponding interactive instructions.

9. The computing device of claim 8, the operations further comprising:
determining types of the interactive data included in the request;
determining a type of interactive data connection channel and establishment rules corresponding to the type of interactive data connection channel based at least in part on a predetermined information table of interactive data connection channels, wherein the type of interactive data connection channel supports all of the types of the interactive data, and wherein the establishment rules comprise establishing a data communication link based on a predetermined protocol; and
establishing the type of interactive data connection channel based on the corresponding establishment rules.

10. The computing device of claim 9, the operations further comprising:
in response to determining that there is not a single type of interactive data connection channel supports all of the types of the interactive data, determining a plurality of types of interactive data connection channels and a plurality of sets of establishment rules corresponding to the plurality of types of interactive data connection channels, and establishing the plurality of types of interactive data connection channels sequentially based on the corresponding plurality of sets of establishment rules, wherein the plurality of types of interactive data connection channels support all of the types of the interactive data.

11. The computing device of claim 8, wherein the determining a plurality of types of interactive data and corresponding interactive instructions included in the interactive data by analyzing field data in a data format of the interactive data based on a predetermined data format table further comprises:
obtaining type field data and interactive instruction field data from the interactive data; and
determining the plurality of types of interactive data and the corresponding interactive instructions based at least in part on the type field data and the interactive instruction field data.

12. The computing device of claim 8, the operations further comprising:
performing decryption on the interactive data before analyzing the field data of the interactive data.

13. The computing device of claim 8, the operations further comprising:
obtaining an execution priority corresponding to each type of interactive data among the plurality of types of interactive data; and
performing interaction operation on each type of interactive data sequentially based on the corresponding execution priority.

14. The computing device of claim 8, wherein the plurality of types of interactive data comprise a bullet screen, a reward, a gift and a special effect package.

15. A non-transitory computer-readable storage medium, storing computer-readable instructions that upon execution by a processor cause the processor to implement operations comprising:
receiving a request of displaying interactive data from another computing device;
establishing an interactive data connection channel with the another computing device based on the request, wherein the interactive data connection channel is a second connection channel created based on another transmission protocol that is different from a transmission protocol used to create an audio and video data connection channel, wherein the audio and video data connection channel is created based on a Transmission Control Protocol (TCP), and wherein the interactive data connection channel is created based on a User Datagram Protocol (UDP);

receiving the interactive data from the another computing device through the established interactive data connection channel;

determining a plurality of types of interactive data and corresponding interactive instructions included in the interactive data by analyzing field data in a data format of the interactive data based on a predetermined data format table; and performing display of the plurality of types of interactive data based on the corresponding interactive instructions.

16. The non-transitory computer-readable storage medium of claim 15, wherein the establishing an interactive data connection channel with the other computing device based on the request further comprises:

determining types of the interactive data included in the request;

determining a type of interactive data connection channel and establishment rules corresponding to the type of interactive data connection channel based at least in part on a predetermined information table of interactive data connection channels, wherein the type of interactive data connection channel supports all of the types of the interactive data, and wherein the establishment rules comprise establishing a data communication link based on a predetermined protocol; and establishing the type of interactive data connection channel based on the corresponding establishment rules.

17. The non-transitory computer-readable storage medium of claim 16, the operations further comprising:

in response to determining that none of a single interactive data connection channel supports all of the types of the interactive data, determining a plurality of types of interactive data connection channels and a plurality of sets of establishment rules corresponding to the plurality of types of interactive data connection channels, and establishing the plurality of types of interactive data connection channels sequentially based on the corresponding plurality of sets of establishment rules, wherein the plurality of types of interactive data connection channels support all of the types of the interactive data.

18. The non-transitory computer-readable storage medium of claim 15, wherein the determining a plurality of types of interactive data and corresponding interactive instructions included in the interactive data by analyzing field data in a data format of the interactive data based on a predetermined data format table further comprises:

obtaining type field data and interactive instruction field data from the data format of the interactive data; and determining the plurality of types of interactive data and the corresponding interactive instructions based at least in part on the type field data and the interactive instruction field data.

19. The non-transitory computer-readable storage medium of claim 15, the operations further comprising:

performing decryption on the interactive data before analyzing the field data of the interactive data.

20. The non-transitory computer-readable storage medium of claim 15, the operations further comprising:

obtaining an execution priority corresponding to each type of interactive data among the plurality of types of interactive data; and performing interaction operation on each type of interactive data sequentially based on the corresponding execution priority.

\* \* \* \* \*